United States Patent
Katrak et al.

(10) Patent No.: US 7,142,132 B2
(45) Date of Patent: Nov. 28, 2006

(54) METHODS AND SYSTEMS FOR MULTI-STATE SWITCHING USING AT LEAST ONE TERNARY INPUT AND AT LEAST ONE DISCRETE INPUT

(75) Inventors: Kerfegar K. Katrak, Fenton, MI (US); Paul A. Bauerle, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 95 days.

(21) Appl. No.: 10/984,386

(22) Filed: Nov. 9, 2004

(65) Prior Publication Data

US 2006/0100758 A1    May 11, 2006

(51) Int. Cl.
    *H03M 5/00*     (2006.01)

(52) U.S. Cl. .............. 341/2; 341/57; 307/113; 307/139

(58) Field of Classification Search .......... 341/2; 326/56, 57, 59; 74/335; 327/492; 330/10; 347/145; 710/100; 702/36; 340/453, 644; 307/139; 701/1
See application file for complete search history.

(56) References Cited

U.S. PATENT DOCUMENTS

| | | | | |
|---|---|---|---|---|
| 3,946,403 A | * | 3/1976 | Ikeuchi et al. .......... 347/145 |
| 4,107,549 A | * | 8/1978 | Moufah .................. 326/59 |
| 4,203,043 A | * | 5/1980 | Katakura ................ 327/492 |
| 4,240,036 A | * | 12/1980 | Kohler .................. 330/10 |
| 4,849,659 A | * | 7/1989 | West ..................... 326/56 |
| 4,977,389 A | * | 12/1990 | Shiraishi ................ 340/461 |
| 5,051,623 A | * | 9/1991 | Yarbrough et al. ....... 326/56 |
| 5,077,539 A | * | 12/1991 | Howatt ................. 330/10 |
| 5,210,449 A | * | 5/1993 | Nishino et al. .......... 326/57 |
| 5,270,633 A | * | 12/1993 | Dijkmans ............... 318/810 |
| 5,528,949 A | * | 6/1996 | Stainton et al. .......... 74/335 |
| 5,617,058 A | * | 4/1997 | Adrian et al. ........... 330/10 |
| 5,784,575 A | * | 7/1998 | Oakland et al. ......... 710/100 |
| 6,133,753 A | * | 10/2000 | Thomson et al. ........ 326/56 |
| 6,686,770 B1 | * | 2/2004 | Vayl .................... 326/56 |

* cited by examiner

*Primary Examiner*—Howard L. Williams
(74) *Attorney, Agent, or Firm*—Christopher DeVries (57) ABSTRACT

Systems, methods and devices are described for placing a controlled device into a desired operating state in response to the position of a multi-position actuator. Two or more switch contacts provide input signals representative of the position of the actuator. Control logic then determines the desired state for the controlled device based upon the input signals received. The desired operating state is determined from any number of operating states defined by the input values. In various embodiments, ternary switching may be used in combination with binary switching to efficiently implement multi-state rotary or linear switches capable of identifying six, twelve, eighteen or any other number of switchable states.

48 Claims, 11 Drawing Sheets

|  | NO. OF TERNARY INPUTS | | | |
|---|---|---|---|---|
|  | 1 | 2 | 3 | 4 |
| 1 | 6 | 18 | 64 | 162 |
| 2 | 12 | 36 | 108 | 324 |
| 3 | 24 | 72 | 216 | 648 |
| 4 | 48 | 144 | 432 | 1296 |

NO. OF DISCRETE INPUTS

METHODS AND SYSTEMS FOR MULTI-STATE SWITCHING USING AT LEAST ONE TERNARY INPUT AND AT LEAST ONE DISCRETE INPUT

TECHNICAL FIELD

The present invention generally relates to multi-state switching logic, and more particularly relates to methods, systems and devices for providing multi-state switching using at least one three state switching contact and at least one discrete contact.

BACKGROUND

Modern vehicles contain numerous electronic and electrical switches. Vehicle features such as climate controls, audio system controls, other electrical systems and the like are now activated, deactivated and adjusted in response to electrical signals generated by various switches in response to driver/passenger inputs, sensor readings and the like. These electrical control signals are typically relayed from the switch to the controlled devices via copper wires or other electrical conductors. Presently, many control applications use a single wire to indicate two discrete states (e.g. ON/OFF, TRUE/FALSE, HIGH/LOW, etc.) using a high or low voltage transmitted on the wire.

To implement more than two states, additional control signals are typically used. In a conventional two/four wheel drive transfer control, for example, four active states of the control (e.g. 2WD mode, auto 4WD mode, 4WD LO mode and 4WD HI mode) as well as a default mode are represented using three to five discrete (two-state) switches coupled to a single or dual-axis control lever. As the lever is actuated, the various switches identify the position of the lever to place the vehicle in the desired mode. Many other types of multi-state switches (e.g. single or multi-pole, momentary, locked position, sliding actuator, rotary actuator and the like) are used in a wide array of applications in automotive, aerospace, military, industrial, consumer and other applications.

As consumers demand additional electronic features in newer vehicles and other products, the amount of wiring used to implement such features continues to increase. This additional wiring frequently occupies valuable space, adds undesirable weight and increases the manufacturing complexity of the vehicle. There is therefore an ongoing need (particularly in vehicle applications) to reduce the amount of wiring in the vehicle without sacrificing features. Further, there is a need to increase the number of states represented by various switches without adding weight, volume or complexity commonly associated with additional wiring, and without sacrificing safety. Still further, there is a demand for switches and switching systems that are capable of reliably selecting between four or more operating states of a controlled device, especially in automotive and other vehicle settings.

In particular, it is desirable to formulate multi-state switching devices that capable of representing four or more operating states without adding excessive cost, complexity or weight. Furthermore, other desirable features and characteristics will become apparent from the subsequent detailed description and the appended claims, taken in conjunction with the accompanying drawings and the foregoing technical field and background.

BRIEF SUMMARY

According to various exemplary embodiments, systems, methods and devices are provided for placing a controlled device into a desired operating state in response to the position of a multi-position actuator. Two or more switch contacts, including at least one ternary switching contact and at least one discrete switching contact, provide input signals representative of the position of the actuator. Control logic then determines the desired state for the controlled device based upon the input signals received. The desired operating state is determined from any number of operating states defined by the input values. In various embodiments, ternary switching may be used in combination with binary switching to efficiently implement multi-state rotary or linear switches capable of identifying six, twelve, eighteen or any other number of switchable states.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, single and/or multi-axis controls for use in vehicles and elsewhere may be formulated with ternary switches to reduce the complexity of the control. Such switches may be used to implement robust selection schemes for various types of control mechanisms, including those used for Normal/Performance/Economy mode switching, cruise control switching, power take off (PTO) controls, "tap up/tap down"

switching and/or the like. Further, by selecting certain signal input combinations to represent the operating states of the controlled device and/or through mechanical interlocking of multiple switch contacts, the robustness of the system can be preserved, or even improved.

Figure 1:
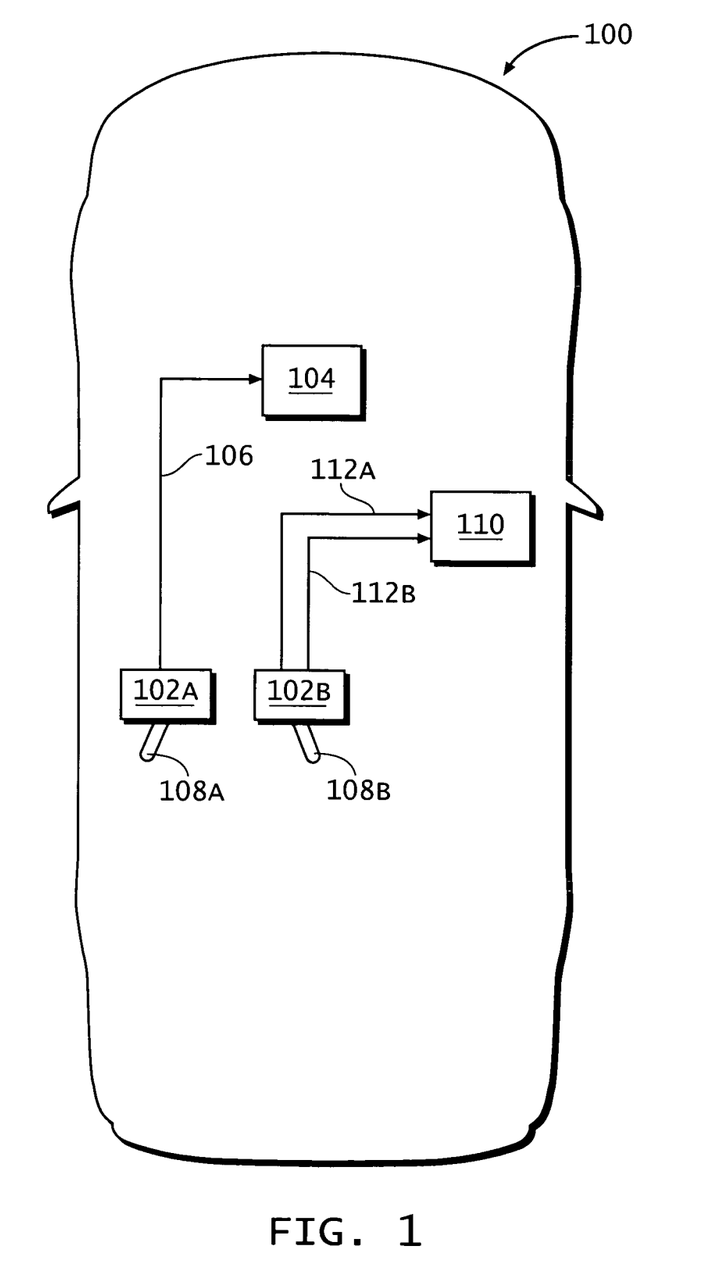
FIG. 1 is a block diagram of an exemplary vehicle.

Turning now to the drawing figures and with initial reference to FIG. 1, an exemplary vehicle 100 suitably includes any number of components 104, 110 communicating with various switches 102A, 102B to receive control signals 106, 112A–B, respectively. The various components 104, 110 may represent any electric or electronic devices present within vehicle 100, including, without limitation, 2WD/4WD transfer case controls, cruise controls, power take off selection/actuation devices, multi-position selectors, digital controllers coupled to such devices and/or any other electrical systems, components or devices within vehicle 100.

Switches 102A–B are any devices capable of providing various logic signals 106, 112A–B to components 104, 110 in response to user commands, sensor readings or other input stimuli. In an exemplary embodiment, switches 102A–B respond to displacement or activation of a lever 108A–B or other actuator as appropriate. Various switches 102A–B may be formulated with electrical, electronic and/or mechanical actuators to produce appropriate ternary output signals onto one or more wires or other electrical conductors joining switches 102 and components 104, 110, as described more fully below. These ternary signals may be processed by components 104, 110 to place the components into desired states as appropriate. In various embodiments, a single ternary signal 106 may be provided (e.g. between switch 102A and component 104 in FIG. 1), and/or multiple signals 112A–B may be provided (e.g. between switch 102B and component 110 in FIG. 1), with logic in component 104 (or an associated controller) combining or otherwise processing the various signals 112A–B to extract meaningful instructions. In still further embodiments, binary, ternary and/or other signals may be combined in any suitable manner to create any number of switchable states.

Many types of actuator or stick-based control devices provide several output signals 112A–B that can be processed to determine the state of a single actuator 108B. Lever 108B may correspond to the actuator in a 2WD/4WD selector, electronic mirror control, power take off selector or any other device operating within one or more degrees of freedom. In alternate embodiments, lever 108A–B moves in a ball-and-socket or other arrangement that allows multiple directions of movement. The concepts described herein may be readily adapted to operate with any type of mechanical selector, including any type of lever, stick, or other actuator that moves with respect to the vehicle via any slidable, rotatable or other coupling (e.g. hinge, slider, ball-and-socket, universal joint, etc.).

Figure 2:
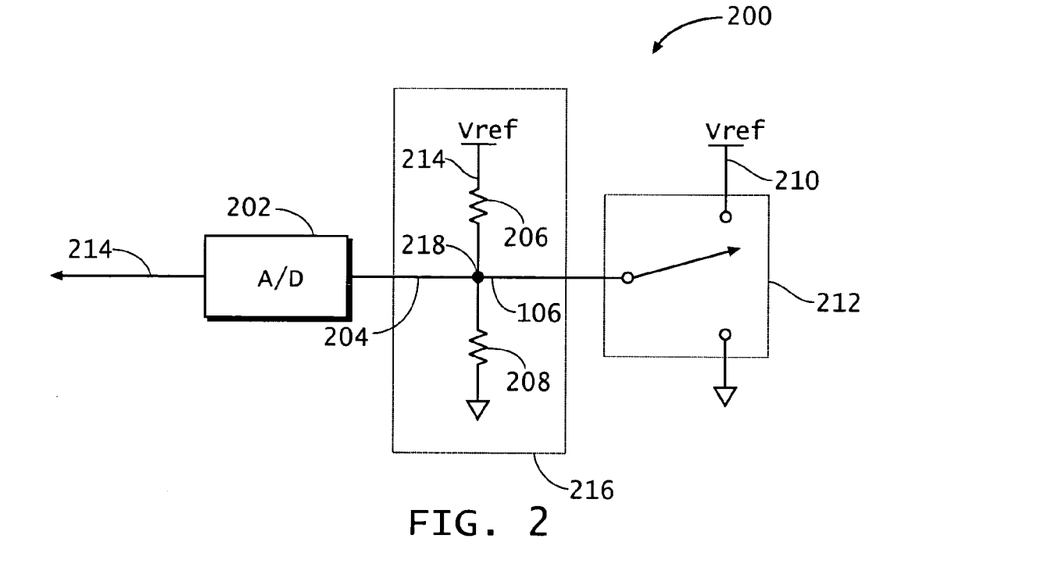
FIG. 2 is a circuit diagram of an exemplary embodiment of a switching circuit.

Referring now to FIG. 2, an exemplary switching circuit 200 suitably includes switch contacts 212, a voltage divider circuit 216 and an analog-to-digital (A/D) converter 202. Switch contacts 212 suitably produce a three-state output signal that is appropriately transmitted across conductor 106 and decoded at voltage divider circuit 216 and/or A/D converter 202. The circuit 200 shown in FIG. 2 may be particularly useful for embodiments wherein a common reference voltage (Vref) for A/D converter 202 is available to switch contacts 212 and voltage divider circuit 216, although circuit 200 may be suited to array of alternate environments as well.

Switch contacts 212 are any devices, circuits or components capable of producing a binary, ternary or other appropriate output on conductor 106. In various embodiments, switch contacts 212 are implemented with a conventional double-throw switch as may be commonly found in many vehicles. Alternatively, contacts 212 are implemented with a multi-position operator or other voltage selector as appropriate. Contacts 212 may be implemented with a conventional three-position low-current switch, for example, as are commonly found on many vehicles. Various of these switches optionally include a spring member (not shown) or other mechanism to bias an actuator 106 (FIG. 1) into a default position, although bias mechanisms are not found in all embodiments. Switch contacts 212 conceptually correspond to the various switches 102A–B shown in FIG. 1.

Switch contacts 212 generally provide an output signal selected from two reference voltages (such as a high reference voltage (e.g. Vref) and a low reference voltage (e.g. ground)), as well as an intermediate value. In an exemplary embodiment, Vref is the same reference voltage provided to digital circuitry in vehicle 100 (FIG. 1), and may be the same reference voltage provided to A/D converter 202. In various embodiments, Vref is on the order of five volts or so, although other embodiments may use widely varying reference voltages. The intermediate value provided by contacts 212 may correspond to an open circuit (e.g. connected to neither reference voltage), or may reflect any intermediate value between the upper and lower reference voltages. An intermediate open circuit may be desirable for many applications, since an open circuit will not typically draw a parasitic current on signal line 106 when the switch is in the intermediate state, as described more fully below. Additionally, the open circuit state is relatively easily implemented using conventional three-position low current switch contacts 212.

Contacts 212 are therefore operable to provide a ternary signal 106 selected from the two reference signals (e.g. Vref and ground in the example of FIG. 2) and an intermediate state. This signal 106 is provided to decoder circuitry in one or more vehicle components (e.g. components 104, 110 in FIG. 1) as appropriate. In various embodiments, the three-state switch contact 212 is simply a multi-position device that merely selects between the two reference voltages (e.g. power and ground) and an open circuit position or other intermediate condition. The contact is not required to provide any voltage division, and consequently does not require electrical resistors, capacitors or other signal processing components other than simple selection apparatus. In various embodiments, switch 212 optionally includes a mechanical interlocking capability such that only one state (e.g. power, ground, intermediate) can be selected at any given time.

The signals 106 produced by contacts 212 are received at a voltage divider circuit 216 or the like at component 104, 110 (FIG. 1). As shown in FIG. 2, an exemplary voltage divider circuit 216 suitably includes a first resistor 206 and a second resistor 208 coupled to the same high and low reference signals provided to contacts 212, respectively. These resistors 206, 208 are joined at a common node 218, which also receives the ternary signal 106 from switch 212 as appropriate. In the exemplary embodiment shown in FIG. 2, resistor 206 is shown connected to the upper reference voltage Vref 214 while resistor 208 is connected to ground. Resistors 206 and 208 therefore function as pull-down and pull-up resistors, respectively, when signals 106 correspond to ground and Vref. While the values of resistors 206, 208 vary from embodiment to embodiment, the values may be selected to be approximately equal to each other such that the common node is pulled to a voltage of approximately half the Vref voltage when an open circuit is created by contact 212. Hence, three distinct voltage signals (i.e. ground, Vref/2, Vref) may be provided at common node 218, as appropriate. Alternatively, the magnitude of the intermediate voltage may be adjusted by selecting the respective values of resistors 206, 208 accordingly. In various embodiments, resistors 206, 208 are both selected as having a resistance on the order of about 1–50 kOhms, for example about 10 kOhms, although any other values could be used in a wide array of alternate embodiments. Relatively high resistance values may assist in conserving power and heat by reducing the amount of current flowing from Vref to ground, although alternate embodiments may use different values for resistors 206, 208.

The ternary voltages present at common node 218 are then provided to an analog-to-digital converter 202 to decode and process the signals 204 as appropriate. In various embodiments, A/D converter 202 is associated with a processor, controller, decoder, remote input/output box or the like. Alternatively, A/D converter 202 may be a comparator circuit, pipelined A/D circuit or other conversion circuit capable of providing digital representations 214 of the analog signals 204 received. In an exemplary embodiment, A/D converter 202 recognizes the high and low reference voltages, and assumes intermediate values relate to the intermediate state. In embodiments wherein Vref is equal to about five volts, for example, A/D converter may recognize voltages below about one volt as a "low" voltage, voltages above about four volts as a "high" voltage, and voltages between one and four volts as intermediate voltages. The particular tolerances and values processed by A/D converter 202 may vary in other embodiments.

As described above, then, ternary signals 106 may be produced by contacts 212, transmitted across a single carrier, and decoded by A/D converter 202 in conjunction with voltage divider circuit 216. Intermediate signals that do not correspond to the traditional "high" or "low" outputs of contact 212 are scaled by voltage divider circuit 216 to produce a known intermediate voltage that can be sensed and processed by A/D converter 202 as appropriate. In this manner, conventional switch contacts 212 and electrical conduits may be used to transmit ternary signals in place of (or in addition to) binary signals, thereby increasing the amount of information that can be transported over a single conductor. This concept may be exploited across a wide range of automotive and other applications.

Figure 3:
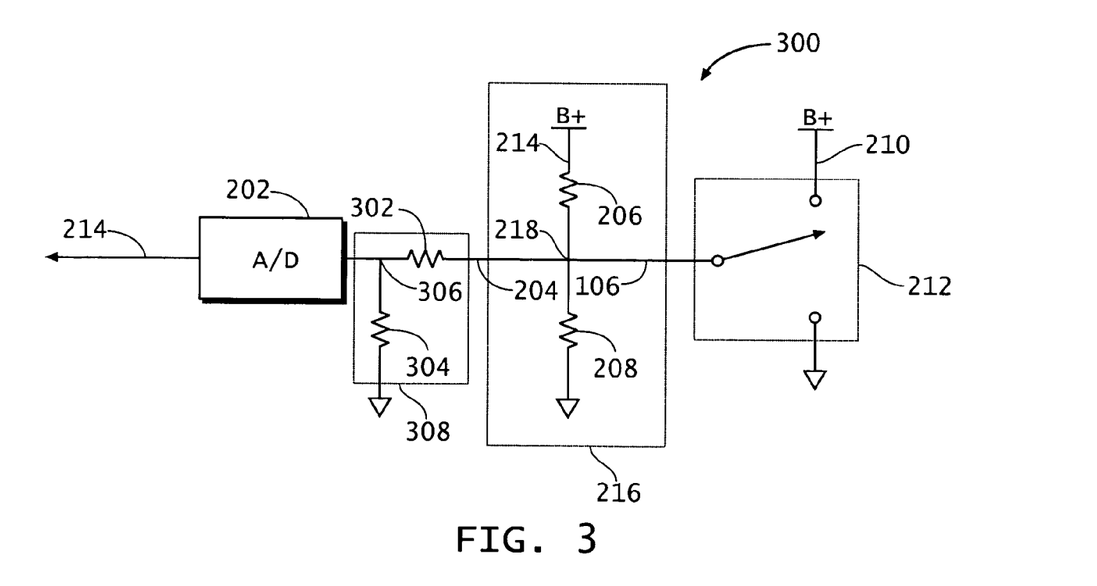
FIG. 3 is a circuit diagram of an alternate exemplary embodiment of a switching circuit.

Referring now to FIG. 3, an alternate embodiment of a switching circuit 300 suitably includes an additional voltage divider 308 in addition to contact 212, divider circuit 216 and A/D converter 202 described above in conjunction with FIG. 2. The circuit shown in FIG. 3 may provide additional benefit when one or more reference voltages (e.g. Vref) provided to A/D converter 202 are unavailable or inconvenient to provide to contact 212. In this case, another convenient reference voltage (e.g. a vehicle battery voltage B+, a run/crank signal, or the like) may be provided to contact 212 and/or voltage divider circuit 216 as shown. Using the concepts described above, this arrangement provides three distinct voltages (e.g. ground, B+/2 and B+) at common node 204. These voltages may be out-of-scale with those expected by conventional A/D circuitry 202, however, as exemplary vehicle battery voltages may be on the order of twelve volts or so. Accordingly, the voltages present at common node 204 are scaled with a second voltage divider 308 to provide input signals 306 that are within the range of sensitivity for A/D converter 202.

In an exemplary embodiment, voltage divider 308 includes two or more resistors 302 and 304 electrically arranged between common node 218 and the input 306 to A/D converter 202. In FIG. 3, resistor 302 is shown between nodes 208 and 306, with resistor 304 shown between node 306 and ground. Various alternate divider circuits 308 could be formulated, however, using simple application of Ohm's law. Similarly, the values of resistors 302 and 304 may be designed to any value based upon the desired scaling of voltages between nodes 218 and 306, although designing the two resistors to be approximately equal in value may provide improved signal-to-noise ratio for circuit 300.

Figure 4:
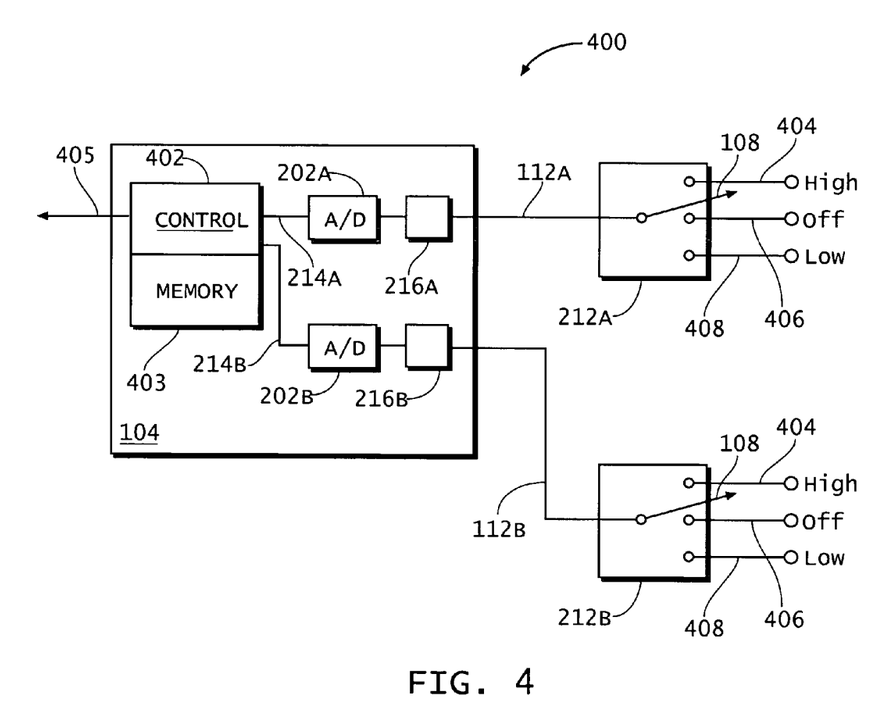
FIG. 4 is a diagram of an exemplary switching system for processing input signals from multiple switches.

Using the concepts set forth above, a wide range of control circuits and control applications may be formulated, particularly within automotive and other vehicular settings. As mentioned above, the binary and/or ternary signals 106 produced by contacts 212 may be used to provide control data to any number of vehicle components 104, 110 (FIG. 1). With reference now to FIG. 4, the various positions 404, 406, 408 of contacts 212A–B may be appropriately mapped to various states, conditions or inputs 405 provided to component 104. As described above, component 104 suitably includes (or at least communicates with) a processor or other controller 402 that includes or communicates with A/D converter 202 and voltage divider circuit 210 to receive ternary signals 112A–B from contacts 212. The digital signals 214 produced by A/D converter 202 are processed by controller 402 as appropriate to respond to the three-state input received at contacts 212. Accordingly, mapping between states 404, 406 and 408 is typically processed by controller 402, although alternate embodiments may include signal processing in additional or alternate portions of system 400. Signals 214 received from contacts 212 may be processed in any appropriate manner, and in a further embodiment may be stored in a digital memory 403 as appropriate. Although shown as separate components in FIG. 4, memory 403 and processor 402 may be logically and/or physically integrated in any manner. Alternatively, memory 403 and processor 402 may simply communicate via a bus or other communications link as appropriate.

Although FIG. 4 shows an exemplary embodiment wherein controller 402 communicates with two switches 212A–B, alternate embodiments may use any number or arrangement of switch contacts 212, as described more fully below. The various outputs 214A–B of the switching circuits may be combined or otherwise processed by controller 402, by separate processing logic, or in any other manner, to arrive at suitable commands provided to device 104. The commands resulting from this processing may be used to place device 104 into a desired state, for example, or to otherwise adjust the performance or status of the device. In various embodiments, a desired state of device 104 is determined by comparing the various input signals 214A–B received from contacts 212A–B (respectively). The state of device 104, then, can be determined by the collective states of the various input signals 214A–B.

As used herein, input state 404 is arbitrarily referred to as '1' or 'high' and corresponds to a short circuit to Vref, B+ or another high reference voltage. Similarly, input state 408 is arbitrarily referred to as '0' or 'low', and corresponds to a short circuit to ground or another appropriate low reference voltage. Intermediate input state 406 is arbitrarily described as 'value' or 'v', and may correspond to an open circuit or other intermediate condition of switch 212. Although these designations are applied herein for consistency and ease of understanding, the ternary states may be equivalently described using other identifiers such as "0", "1" and "2", "A", "B" and "C", or in any other convenient manner. The naming and signal conventions used herein may therefore be modified in any manner across a wide array of equivalent embodiments.

In many embodiments, intermediate state 406 of contacts 212 is most desirable for use as a "power off", "default" or "no change" state of device 104, since the open circuit causes little or no current to flow from contacts 212, thereby conserving electrical power. Moreover, an 'open circuit' fault is typically more likely to occur than a faulty short to either reference voltage; the most likely fault (e.g. open circuit) conditions may therefore be used to represent the least disruptive states of device 104 to preserve robustness. Short circuit conditions, for example, may be used to represent an "OFF" state of device 104. In such systems, false shorts would result in turning device 104 off rather than improperly leaving device 104 in an "ON" state. On the other hand, some safety-related features (e.g. headlights) may be configured to remain active in the event of a fault, if appropriate. Accordingly, the various states of contacts 212 described herein may be reassigned in any manner to represent the various inputs and/or operating states of component 104 as appropriate.

Using the concepts of ternary switching, various exemplary mappings of contacts 212 for certain automotive and other applications may be defined as set forth below. The concepts described above may be readily implemented to create a multi-state control that could be used, for example, to control a power takeoff, powertrain component, climate or audio system component, cruise control, other mechanical and/or electrical component, and/or any other automotive or other device. In such embodiments, two or more switch contacts 212 are generally arranged proximate to an actuator 108, with the outputs of the switches corresponding to the various states/positions of actuator 108. Alternatively, however, the various switch contacts 212 could interact with separate actuators 108, with the various input states representing the various positions of the distinct actuators. Stated another way, a common controller 402 may be used to decode the various states of multiple independent switch contacts 212A–B in any manner. Further, any number of binary, ternary and/or other types of switch contacts 212 may be interconnected or otherwise intermixed to create switching arrangements of any type.

Figure 5:
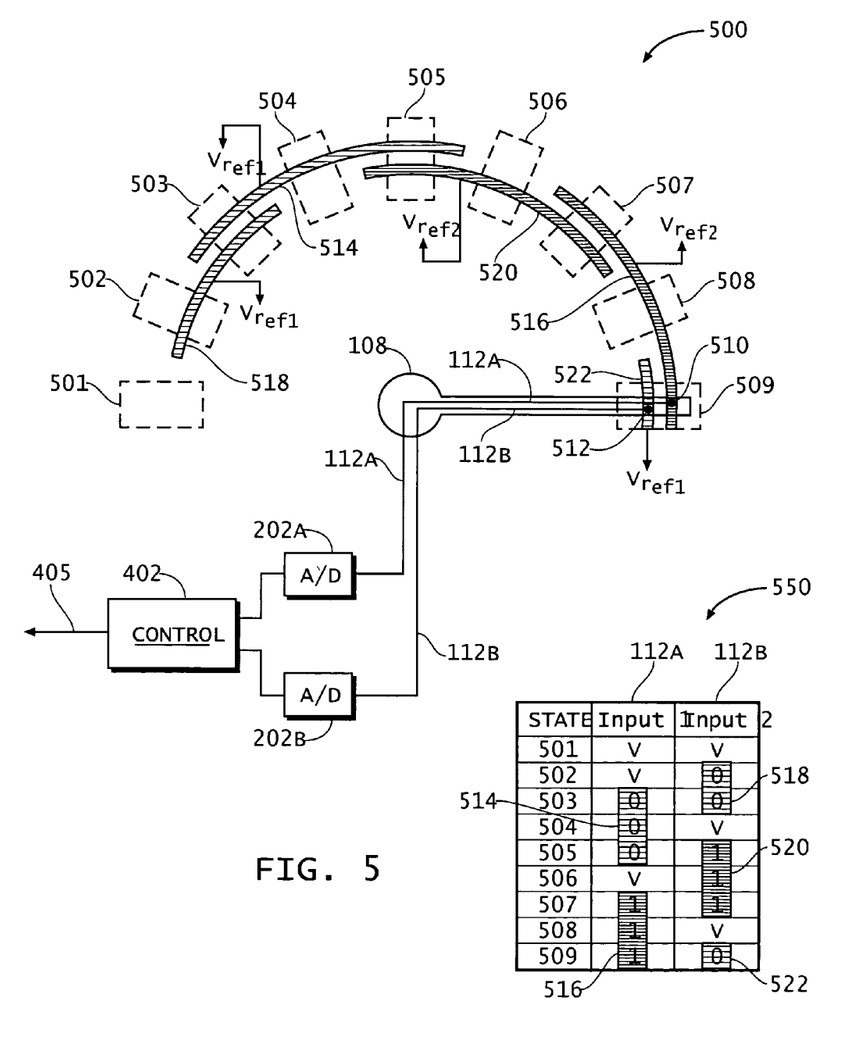
FIG. 5 is a diagram of an exemplary switching system having two three-state inputs and nine output states.

With reference to FIG. 5, for example, an exemplary switching system 500 suitable for representing nine distinct operating states suitably includes any number of electrodes, electrical contacts or other conducting members 514, 516, 518, 520 arranged to create nine unique positions 501–509 for actuator 108. Some or all of the positions 501–509 correspond to operating modes of the controlled device 104/110 as appropriate. As actuator 108 moves through the various operating positions 501–509, two separate inputs 510, 512 on actuator 108 interact with the various contacts 514, 516, 518, 520 and 522 to produce electrical signals 112A and 112B that indicate the position 501–509 of actuator 108. As shown in FIG. 5, electrodes 514 and 516 suitably cooperate with input 510 to provide a first input signal (Input1) 112A, and electrodes 518, 520 and 522 cooperate with input 512 to provide a second input signal (Input 2) 112B as appropriate. The various electrical contacts are suitably coupled to appropriate reference voltages (e.g. ground, battery voltage B+, or the like) to produce the desired electrical signals 112A–B that can be received at A/D converter 202 and properly decoded at controller 402. Decoding may be accomplished through any discrete or integrated processing circuitry, through digital processing (e.g. using a lookup table or other data structures), or through any other technique.

Through proper arrangement of the electrical contacts with respect to actuator 108, unique combinations of signals 112A and 112 can be created for each position 501–509 of actuator 108. One exemplary scheme for arranging the various contacts is shown in inset table 550 in FIG. 5. As shown in table 550, the various operating states can be arranged to maximize and exploit similarities in adjacent states to thereby reduce the number of electrical contacts used to implement system 500, which in turn reduces the cost, weight and complexity of the switch. By placing each of the states having "low" values of Input1 together, for example, a single contact 514 can be provided for all three states 503–505. Similarly, a single contact 520 provides a common "high" reference voltage for states 505–507. Moreover, grouping common signal values together in adjacent actuator states reduces the number of signal transitions taking place during changes to adjacent states. Because each adjacent state transition has at least one common value of signal 112A or 112B, switch operation is simplified. This concept can be exploited in myriad ways across a wide array of alternate embodiments, and is described more fully below.

Moreover, in embodiments wherein the "intermediate" or "value" signal is designed to correspond to an open circuit, no external electrical reference need be provided for those positions associated with the intermediate value, since the lack of an input contact could be used to produce the open circuit at input 510 and/or input 512. State 501 in FIG. 5, for example, generates open circuit conditions at both inputs 510 and 512, since actuator 108 does not touch any electrical contact, and therefore no input reference voltage is provided in this position. As discussed above, this state 501 may provide a suitable "default" or "no action" state for many embodiments, since little or no current flows through the open circuit when actuator 108 is in position 501.

Various additional efficiencies could be incorporated into further embodiments. Contacts having common electrical characteristics, for example, could be formulated as single electrical nodes on a circuit board, substrate or other surface. Contacts 514, 518 and 522, for example, could be interconnected or otherwise formed as a single electrical node, thereby further reducing the number of electrical connections within system 500. Similarly, contacts 516 and 520 could be formed as a common electrical node. Further, the hemispherical arrangement shown in FIG. 5 could be modified in any manner by placing the various contacts in any suitable physical arrangement. The various operating states 501–509 could be arranged in linear fashion, for example, with a sliding actuator 108 providing signals 112A and 112B. Any subset of operating states 501–509 could be provided, with switch system 500 providing any number of output states. Further, the signal mappings shown in table 550 are exemplary, and any operating states 501–509 could be represented by any values of signals 112A–B organized in any fashion.

Another advantage available from various embodiments (including the exemplary embodiment shown in FIG. 5) is improved physical and electrical isolation of the signal contacts. That is, by locating the "value" or "open circuit" inputs between the contacts for the reference values, the two reference values are increasingly isolated from each other. By increasing the space between contacts, the opportunity for the contacts to inadvertently touch each other, and therefore the likelihood of contact burnout, is reduced.

Figure 6:
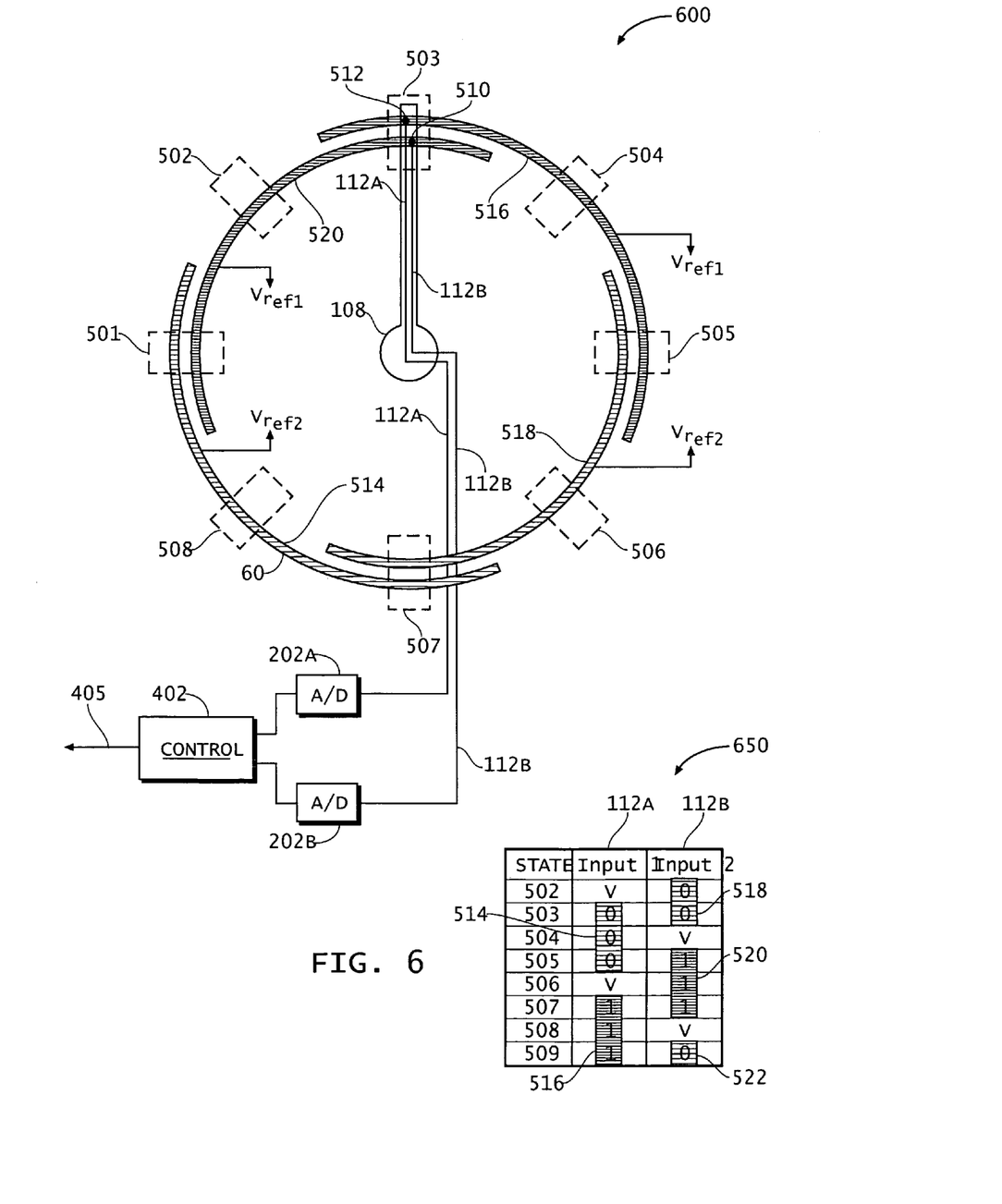
FIG. 6 is a diagram of an exemplary rotary switching system having two three-state inputs and eight output states.

With reference now to FIG. 6, an exemplary eight-state rotary switch system 600 may be formed from the general concepts set forth in FIG. 5. In the exemplary embodiment shown in FIG. 6 (as compared to the embodiment shown in FIG. 5), contacts 518 and 522 have been combined, the various operating states 502–509 are arranged in circular fashion, and state 501 has been omitted. Although this omission reduces the number of available states from nine to eight, it does allow for efficient layout of the rotary switch 600. As seen in table 650, movement of actuator 108 from state 509 to state 502 simply involves the transition of Input1 112A from the "high" value to the "intermediate" value as input 510 of actuator 108 loses connectivity with contact 514 and enters the open circuit condition. Removing the "dual open circuit" state (state 501 in FIG. 5) from the rotary switch therefore streamlines signal transitions between the various actuator positions 502–509, thereby simplifying transitions in rotary switch 600. Other signaling schemes 650 could also be formulated that would produce similar results.

Figure 7:
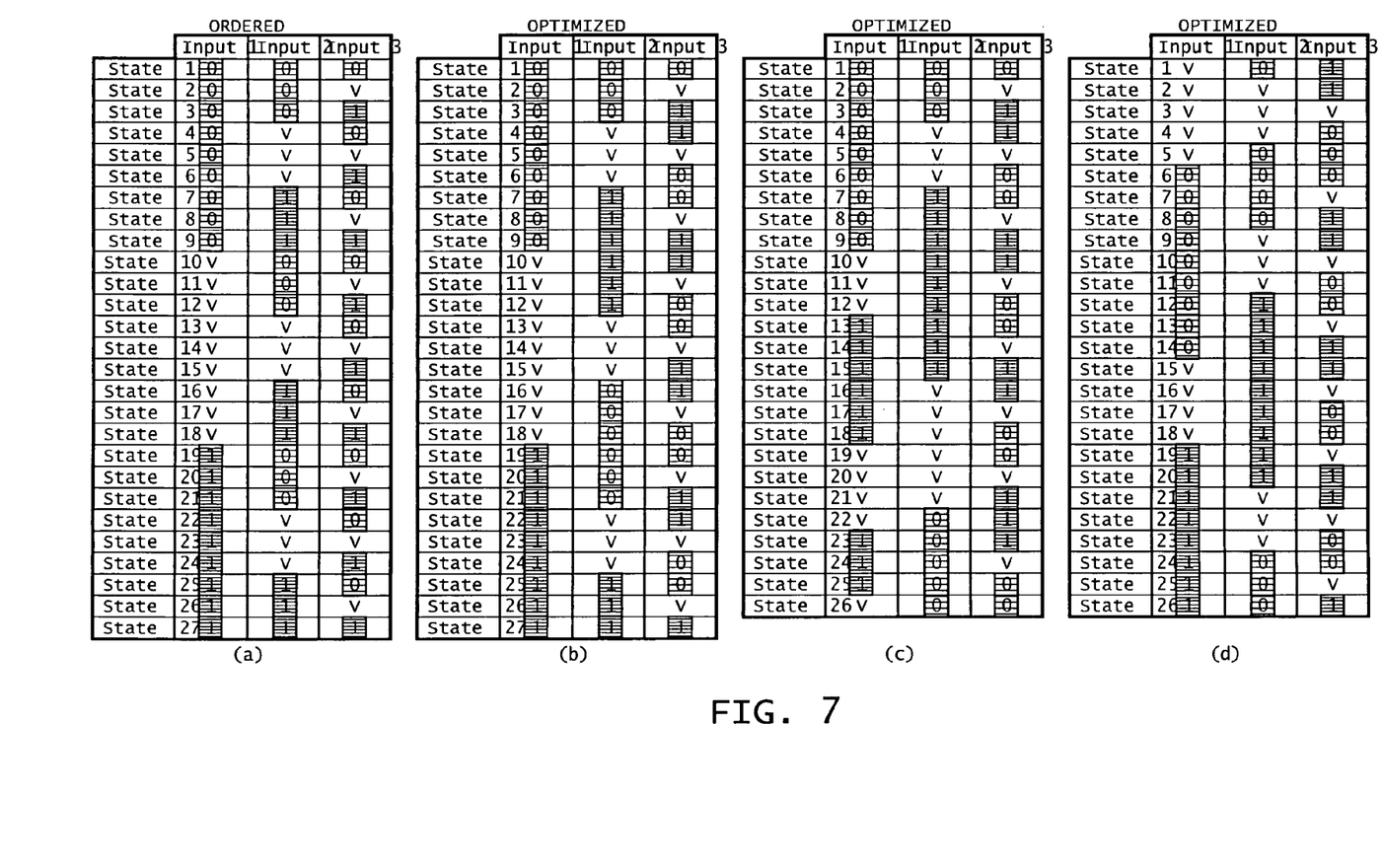
FIG. 7 is a chart showing signal mappings for various exemplary twenty-seven and twenty-six state switching systems.

The general concepts described with respect to FIGS. 5 and 6 may be further applied to switching systems having more than two ternary switching contacts. With reference to FIG. 7, four exemplary signal allocation schemes are shown for a switching system having three ternary signal inputs. FIG. 7(a) shows a numerically-ordered listing of the twenty-seven states that can be logically represented with three ternary inputs, with groupings of high and low reference voltage signals shown with different levels of shading. Although a control, indicator or other switching system could be formulated according to the scheme shown in FIG. 7(a), such a scheme would typically include about twenty-six separate electrical contacts to implement in the order shown. FIG. 7(b) therefore shows a more optimized signal table for a switching system having three ternary inputs. Although both FIGS. 7(a) and 7(b) describe twenty-seven state implementations, the FIG. 7(b) table could be implemented with sixteen electrical contacts due to efficiencies in grouping states having common signal values as adjacent states. Exemplary arrangements for electrical contacts that exploit adjacencies and common signals are shown with shaded boxes in FIG. 7, although other arrangements could be used in any number of alternate embodiments.

FIGS. 7(c) and 7(d) provide exemplary state tables for twenty-six state implementations that could be used in a rotary fashion using the concepts described above in conjunction with FIG. 6. In each of these tables, each state is arranged such that transitions to the preceding or succeeding state result from a single signal transition. Other tables could be formulated using similar concepts in a wide array of equivalent embodiments.

Figure 8:
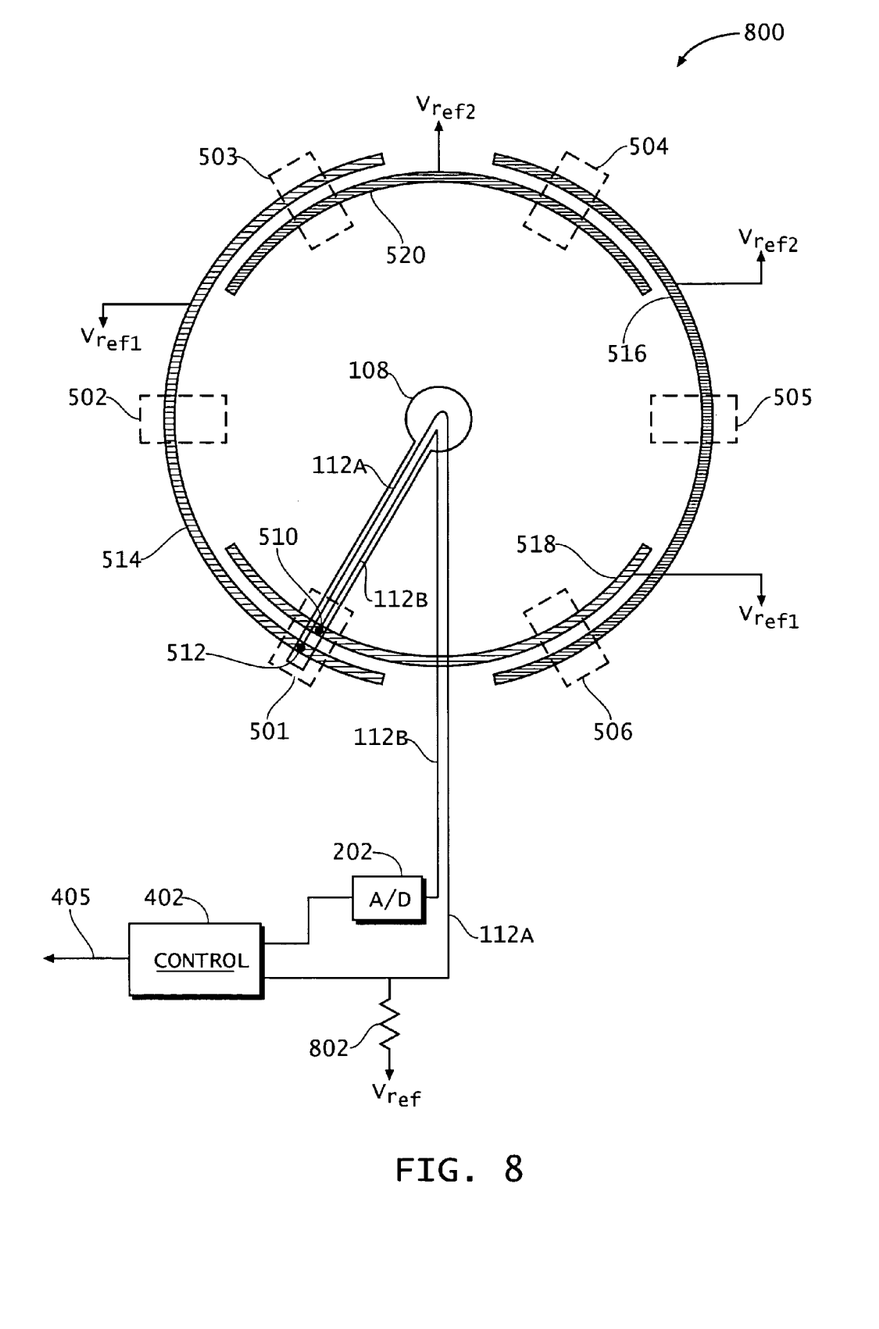
FIG. 8 is a diagram of an exemplary rotary switching system having both ternary and discrete inputs and twelve output states.

Similar concepts may be applied to hybrid switching systems formed from combinations of ternary and discrete (e.g. binary) inputs. With reference now to FIG. 8, an exemplary switching system 800 capable of representing six states 501–506 suitably includes a discrete input 112A and a ternary input 112B provided by discrete and ternary switches, respectively. Like the embodiments shown above, each switch can be formed with any number of contacts, such as contacts 514 and 516 in the discrete switch and contacts 518 and 520 in the ternary switch. As described above, contacts 510 and 512 on actuator 108 interact with the various fixed contacts to create the discrete and ternary switches, respectively. Although FIG. 8 shows a rotary-type switching system 800 with position 506 adjacent to position 501, many other linear, rotary and other switch arrangements could be formulated, with switches and switching contacts arranged in any manner.

Switching system 800 operates in any suitable manner, such as in a manner similar to the ternary systems described above. In an exemplary embodiment, actuator 108 has various positions 501–506 corresponding to the various electrical signals provided by the electrical contacts 514, 516, 518 and 520, with ternary input 512 entering the intermediate/open signal mode when input 512 is not in communication with either contact 518 or 520. Because input 112A is shown configured as a binary/discrete input with only two possible states (e.g. "low" and "high"), either of the two discrete contacts 518 or 520 could be removed from system 800 and replaced with a bias resistor 802 as appropriate. If the "low" contact 514 is removed, resistor 802 should be connected to the low reference voltage (e.g. ground) such that resistor 802 functions as a "pull-down" resistor. Alternatively, the "high" contact 516 could be removed and resistor 802 is connected to the high reference voltage (e.g., battery or B+) such that resistor 802 functions as a "pull up" resistor using conventional electrical principals. Various equivalent electrical arrangements could be formulated across a wide array of alternate embodiments.

Figure 9:
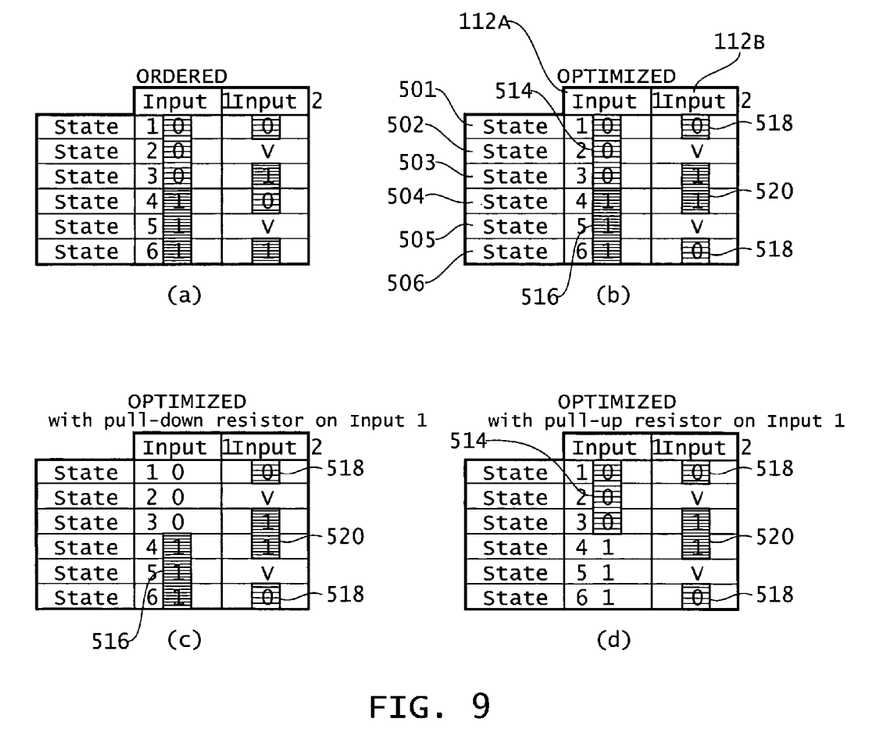
FIG. 9 is a chart showing signal mappings for various exemplary six state switching systems.

With reference now to FIG. 9, various exemplary signaling arrangements are shown, with the FIG. 9(b) arrangement generally correlating with switching circuit 800 shown in FIG. 8. FIG. 9(a) shows the six ordered states available from one discrete and one ternary input, with FIG. 9(b) showing these states arranged for efficient grouping of electrical contacts and/or rotary switch operation as described above. FIG. 9(c) shows a similar arrangement as FIG. 9(b), but with one of the electrical contacts 514 being removed and replaced by a pull-down resistor 802 as described above. FIG. 9(d) similarly corresponds to the "high" electrical contact 516 being replaced by a "pull-up" resistor 802 as appropriate.

Figure 10:
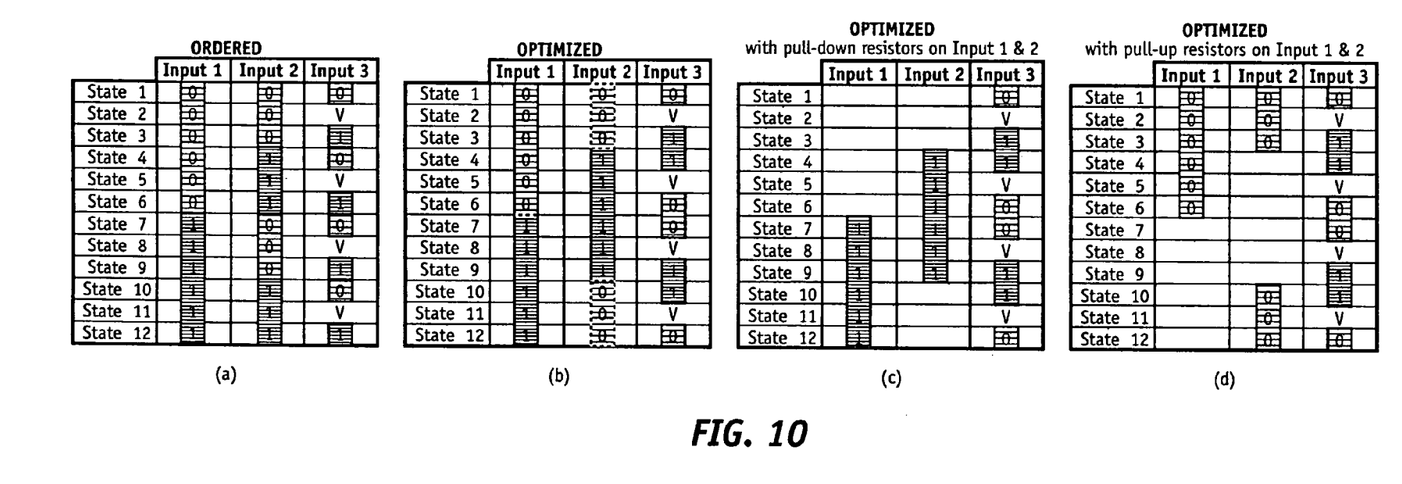
FIG. 10 is a chart showing signal mappings for various exemplary twelve-state switching systems.

The concepts shown in FIGS. 8 and 9 could be further exploited through the addition of one or more discrete and/or ternary switching inputs as appropriate. FIG. 10, for example, shows exemplary signaling schemes for various switching systems having two discrete and one ternary input. Such schemes are capable of representing as many as twelve separate states. While FIG. 10(a) shows an ordered arrangement of the twelve states, FIG. 10(b) shows an arrangement that is optimized for efficient contact placement. FIGS. 10(c) and 10(d) show exemplary arrangements that could be further optimized through the use of pull-up or pull-down resistors 802, respectively, using the concepts described above.

Figure 11:
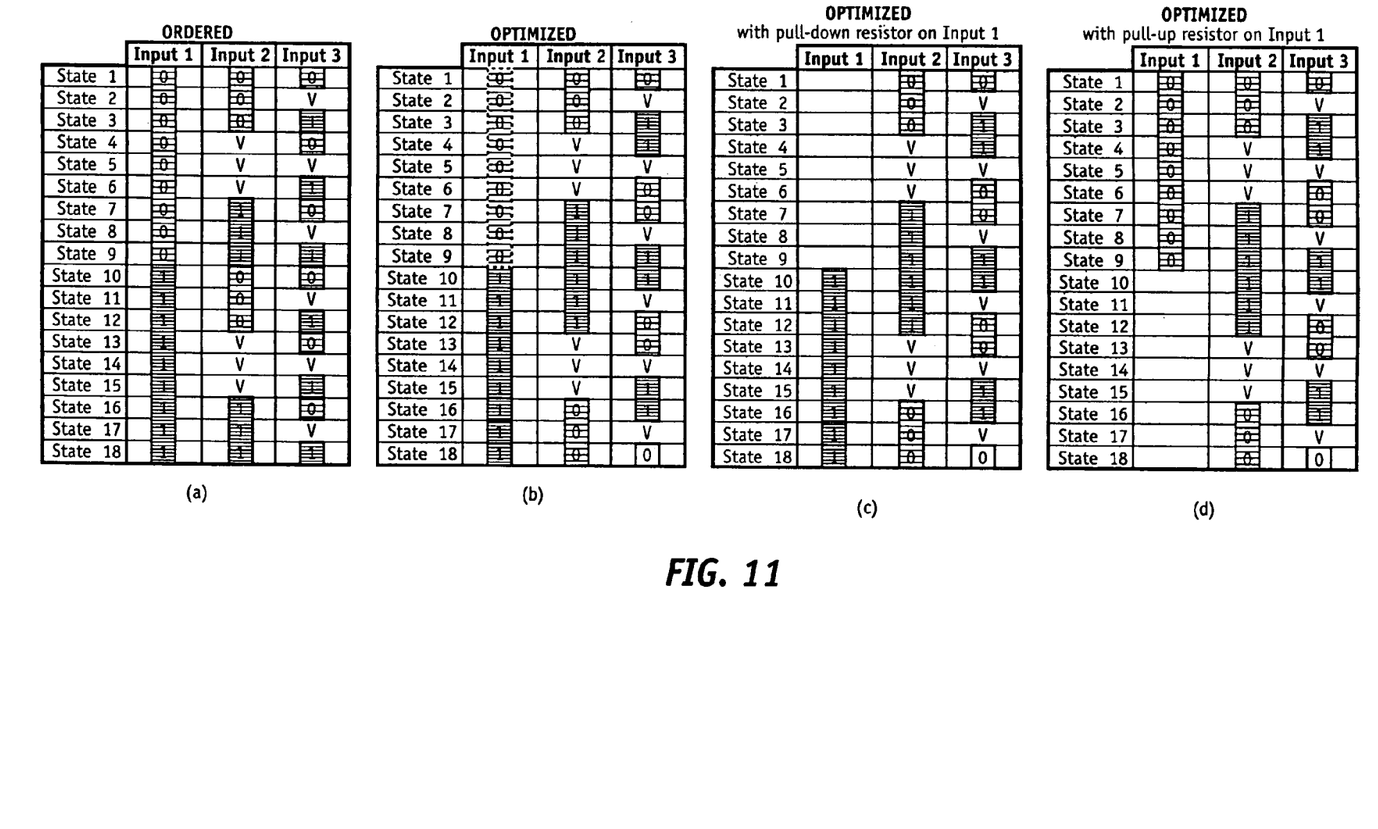
FIG. 11 is a chart showing signal mappings for various exemplary eighteen-state and twenty-six state switching systems.

FIG. 11 similarly shows exemplary signaling schemes for various switching systems having one discrete and two ternary inputs, which could be capable of representing as many as eighteen unique states. FIG. 11(a) shows these states in simple numeric order, with FIG. 11(b) showing a more optimized arrangement for a reduced number of electrical contacts. FIGS. 11(c) and 11(d) show similar arrangements that are further optimized through the use of "pull-down" or "pull-up" resistors 802, respectively.

The general concepts described herein could be modified in many different ways to implement a diverse array of equivalent multi-state switches, actuators and other controls. The various positions of actuator 108 may be extracted and decoded through any type of processing logic, including any combination of discrete components, integrated circuitry and/or software, for example. Moreover, the various positional and switching structures shown in the figures and tables contained herein may be modified and/or supplemented in any manner. That is, the various input signals could be arranged in any order and in any combination in a wide array of alternate embodiments.

Figure 12:
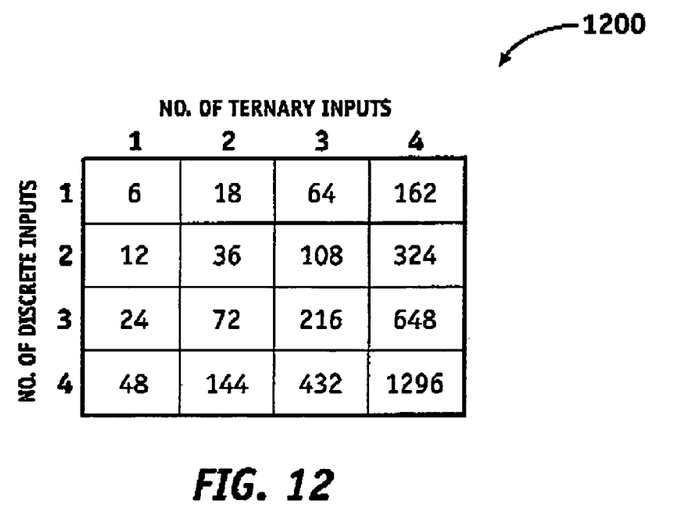
FIG. 12 is a table of exemplary state representations available from various exemplary combinations of ternary and binary switching inputs.

Still further, the concepts presented herein may be applied to any number of ternary and/or discrete switches, or any combination of ternary and discrete switches to create any number of potential or actual robust and non-robust state representations. Similar concepts to those described above could be applied to four or more input signals, for example, allowing for control systems capable of processing any number of states in a wide array of equivalent embodiments. The concepts used herein could be implemented using four or more ternary and/or discrete inputs to produce switching systems capable of representing twenty-four (e.g. one ternary and four discrete inputs), thirty-six (e.g. two ternary and two discrete inputs), fifty-four (e.g. three ternary and one discrete input) or any other number of states, for example. A table 1200 of possible state representations available from various exemplary combinations of discrete and ternary switch inputs is shown in FIG. 12. Alternatively or additionally, some or all of the inputs used in defining the various states could be used for redundancy purposes, thereby improving the reliability and robustness of the switching systems implemented.

Although the various embodiments are most frequently described with respect to automotive applications, the invention is not so limited. Indeed, the concepts, circuits and structures described herein could be readily applied in any commercial, home, industrial, consumer electronics or other setting. Ternary switches and concepts could be used to implement a conventional joystick, for example, or any other pointing/directing device based upon four or more directions. The concepts described herein could similarly be readily applied in aeronautical, aerospace; defense, marine or other vehicular settings as well as in the automotive context.

While at least one exemplary embodiment has been presented in the foregoing detailed description, a vast number of variations exist. The various circuits described herein may be modified through conventional electrical and electronic principles, for example, or may be logically altered in any number of equivalent embodiments without departing from the concepts described herein. The exemplary embodiments described herein are intended only as examples, and are not intended to limit the scope, applicability, or configuration of the invention in any way. Rather, the foregoing detailed description will provide those skilled in the art with a convenient road map for implementing one or more exemplary embodiments. Various changes can therefore be made in the functions and arrangements of elements set forth herein without departing from the scope of the invention as set forth in the appended claims and the legal equivalents thereof.

What is claimed is:

1. A switching system for providing a control signal to a controlled component in response to a position of an actuator, the switching system comprising:
    a discrete switching contact configured to provide a first input value as a function of the actuator;
    a ternary switching contact configured to provide a second input value as a function of the position of the actuator; and
    decoding circuitry configured to receive the first and second input values and to produce the control signal in response to the first and second input values.

2. The switching system of claim 1 wherein the second input value is selected from a low reference value, a high reference value, and an intermediate value.

3. The switching system of claim 2 further comprising a plurality of electrical contacts arranged around the actuator to switchably interact with the ternary switching contact and the discrete switching contact.

4. The switching system of claim 3 wherein each of the plurality of electrical contacts is electrically coupled to a reference voltage corresponding to either the low reference value or the high reference value.

5. The switching system of claim 4 wherein the ternary switching contact is configured to provide the intermediate value as the second input value when not in contact with any of the plurality of electrical contacts.

6. The switching system of claim 5 wherein the intermediate value corresponds to an open circuit condition.

7. The switching system of claim 2 wherein the control signal is associated with one of a plurality of states of the actuator, each of the plurality of states corresponding to one of a plurality of adjacent positions of the actuator.

8. The switching system of claim 7 wherein the plurality of positions is defined by a plurality of electrical contacts disposed proximate to the actuator.

9. The switching system of claim 8 wherein the plurality of adjacent positions are defined by the first and second input values (Input1 and Input2) as follows:

| State | Input1 | Input2 |
|-------|--------|--------|
| 1 | 0 | 0 |
| 2 | 0 | v |
| 3 | 0 | 1 |
| 4 | 1 | 1 |
| 5 | 1 | v |
| 6 | 1 | 0. |

10. The switching system of claim 9 wherein the plurality of electrical contacts comprises a first contact configured to provide Input2 of states 3 and 4, and a second contact configured to provide Input2 of states 1 and 6.

11. The switching system of claim 9 wherein the plurality of electrical contacts further comprises a third contact configured to provide Input1 of states 1, 2 and 3.

12. The switching system of claim 11 wherein the decoding circuitry comprises a pull-up resistor.

13. The switching system of claim 11 wherein the decoding circuitry comprises a pull-down resistor.

14. The switching system of claim 9 wherein the plurality of electrical contacts further comprises a third contact configured to provide Input1 of states 4, 5 and 6.

15. A switching system for providing a control signal to a controlled component in response to a position of an actuator, the switching system comprising:
    a first discrete switching contact configured to provide a first input value (Input1) as a function of the actuator;
    a second discrete switching contact configured to provide a second input value (Input2) as a function of the position of the actuator; and
    a ternary switching contact configured to provide a third input value (Input3) as a function of the position of the actuator; and
    decoding circuitry configured to receive the first, second and third input values and to produce the control signal in response to the first and second values.

16. The switching system of claim 15 wherein the third input value is selected from a low reference value, a high reference value, and an intermediate value.

17. The switching system of claim 16 wherein the control signal corresponds to one of a plurality of states of the first, second and third input values, and wherein each of the plurality of states corresponds to one of a plurality of adjacent positions of the actuator.

18. The switching system of claim 17 wherein the plurality of adjacent positions is defined by a plurality of electrical contacts disposed proximate to the actuator and configured to provide the first, second and third input values to the switching contacts.

19. The switching system of claim 18 wherein the plurality of adjacent positions are defined by the first, second and third input values (Input1, Input2 and Input3) as follows:

| State | Input1 | Input2 | Input3 |
|-------|--------|--------|--------|
| 1  | 0 | 0 | 0 |
| 2  | 0 | 0 | v |
| 3  | 0 | 0 | 1 |
| 4  | 0 | 1 | 1 |
| 5  | 0 | 1 | v |
| 6  | 0 | 1 | 0 |
| 7  | 1 | 1 | 0 |
| 8  | 1 | 1 | v |
| 9  | 1 | 1 | 1 |
| 10 | 1 | 0 | 1 |
| 11 | 1 | 0 | v |
| 12 | 1 | 0 | 0. |

20. The switching system of claim 19 wherein the plurality of electrical contacts comprises a first contact configured to provide the third input (Input3) of states 3 and 4; a second contact configured to provide the third input (Input3) of states 6 and 7; a third contact configured to provide the third input (Input3) of states 9 and 10; and a fourth contact configured to provide the third input (Input3) of states 1 and 12.

21. The switching system of claim 20 wherein the plurality of electrical contacts further comprises a fifth contact configured to provide the second input (Input2) of States 4–9 and a sixth contact configured to provide the first input (Input1) of States 7–12.

22. The switching system of claim 21 wherein the decoding circuitry comprises at least one pull-down resistor.

23. The switching system of claim 21 wherein the decoding circuitry comprises at least one pull-up resistor.

24. The switching system of claim 20 wherein the plurality of electrical contacts further comprises a fifth contact configured to provide the second input (Input2) of States 1–3 and 10–12 and a sixth contact configured to provide the first input (Input1) of States 1–6.

25. The switching system of claim 19 wherein the plurality of adjacent positions are arranged in a rotary fashion around the actuator.

26. The switching system of claim 25 wherein State1 is arranged adjacent to State 12.

27. A switching system for providing a control signal to a controlled component in response to a position of an actuator, the switching system comprising:
   a discrete switching contact configured to provide a first input value (Input1) as a function of the actuator;
   a first ternary switching contact configured to provide a second input value (Input2) as a function of the position of the actuator; and
   a second ternary switching contact configured to provide a third input value (Input3) as a function of the position of the actuator; and
   decoding circuitry configured to receive the first, second and third input values and to produce the control signal in response to the first and second values.

28. The switching system of claim 27 wherein the second and third input values are selected from a low reference value, a high reference value, and an intermediate value.

29. The switching system of claim 28 wherein the control signal corresponds to one of a plurality of states of the first, second and third input values, and wherein each of the plurality of states corresponds to one of a plurality of adjacent positions of the actuator.

30. The switching system of claim 29 wherein the plurality of adjacent positions is defined by a plurality of electrical contacts disposed proximate to the actuator and configured to provide the first, second and third input values to the switching contacts.

31. The switching system of claim 30 wherein the plurality of adjacent positions are defined by the first, second and third input values (Input1, Input2 and Input3) as follows:

| State | Input1 | Input2 | Input3 |
|-------|--------|--------|--------|
| 1  | 0 | 0 | 0 |
| 2  | 0 | 0 | v |
| 3  | 0 | 0 | 1 |
| 4  | 0 | v | 1 |
| 5  | 0 | v | v |
| 6  | 0 | v | 0 |
| 7  | 0 | 1 | 0 |
| 8  | 0 | 1 | v |
| 9  | 0 | 1 | 1 |
| 10 | 1 | 1 | 1 |
| 11 | 1 | 1 | v |
| 12 | 1 | 1 | 0 |
| 13 | 1 | v | 0 |
| 14 | 1 | v | v |
| 15 | 1 | v | 1 |
| 16 | 1 | 0 | 1 |
| 17 | 1 | 0 | v |
| 18 | 1 | 0 | 0. |

32. The switching system of claim 31 wherein the plurality of electrical contacts comprises a first contact configured to provide the third input (Input3) of states 3 and 4; a second contact configured to provide the third input (Input3) of states 6 and 7; a third contact configured to provide the third input (Input3) of states 9 and 10; a fourth contact configured to provide the third input (Input3) of states 12 and 13; a fifth contact configured to provide the third input (Input3) of states 15 and 16; and a sixth contact configured to provide the third input (Input3) of states 1 and 18.

33. The switching system of claim 32 wherein the plurality of electrical contacts further comprises a seventh contact configured to provide the second input (Input2) of States 7–12 and an eighth contact configured to provide the second input (Input2) of States 1–3 and 16–18.

34. The switching system of claim 33 wherein the plurality of electrical contacts further comprises a ninth contact providing the first input (Input1) of States 1–9.

35. The switching system of claim 34 wherein the decoding circuitry comprises at least one pull-up resistor.

36. The switching system of claim 33 wherein the plurality of electrical contacts further comprises a ninth contact providing the first input (Input1) of States 10–18.

37. The switching system of claim 36 wherein the decoding circuitry comprises at least one pull-down resistor.

38. The switching system of claim 31 wherein the plurality of adjacent positions are arranged in a rotary fashion around the actuator.

39. The switching system of claim 38 wherein State1 is arranged adjacent to State18.

40. A method of determining a position of an actuator, to method comprising to steps of:
receiving a first ternary signal having a low, intermediate or high value determined by the position of the actuator;
receiving a discrete signal having the low or the high value determined by the position of the actuator; and
decoding the ternary and discrete signals to thereby determine the position of the actuator as a function of the first ternary value and the discrete value.

41. The method of claim 40 further comprising the step of receiving a second ternary signal having a low, intermediate or high value selected in response to the position of the actuator.

42. The method of claim 41 wherein the decoding step further comprises decoding the second ternary value.

43. The method of claim 40 further comprising the step of receiving a second discrete signal having the low or high value selected in response to the position of the actuator.

44. The method of claim 43 wherein the decoding step further comprises decoding the second discrete value.

45. An apparatus for determining a position of an actuator, the apparatus comprising:
means for receiving a ternary signal having a low, intermediate or high value and a discrete signal having a low value or a high value, wherein each of the ternary and discrete signals are determined by the position of the actuator; and
means for decoding the ternary and discrete signals to thereby determine the position of the actuator as a function of the ternary and discrete signals.

46. The apparatus of claim 45 further comprising means for converting the ternary signal from the low, intermediate or high values to a corresponding digital value.

47. The apparatus of claim 45 wherein the receiving means further receives a second ternary signal having the low, intermediate or high value, and wherein the decoding means further decodes the second ternary signal to determine the position of the actuator.

48. The apparatus of claim 45 wherein the receiving means further receives a second discrete signal having the low or high value, and wherein the decoding means further decodes the second discrete signal to determine the position of the actuator.

* * * * *